Sept. 9, 1969  F. E. HOOK ET AL  3,465,825
AQUEOUS CEMENTING COMPOSITION ADAPTABLE TO HIGH TURBULENT
FLOW AND LOW FLUID LOSS TO POROUS CONTACTING
SURFACES, AND METHOD OF CEMENTING
A WELL USING SAME
Filed Dec. 2, 1966  2 Sheets-Sheet 1

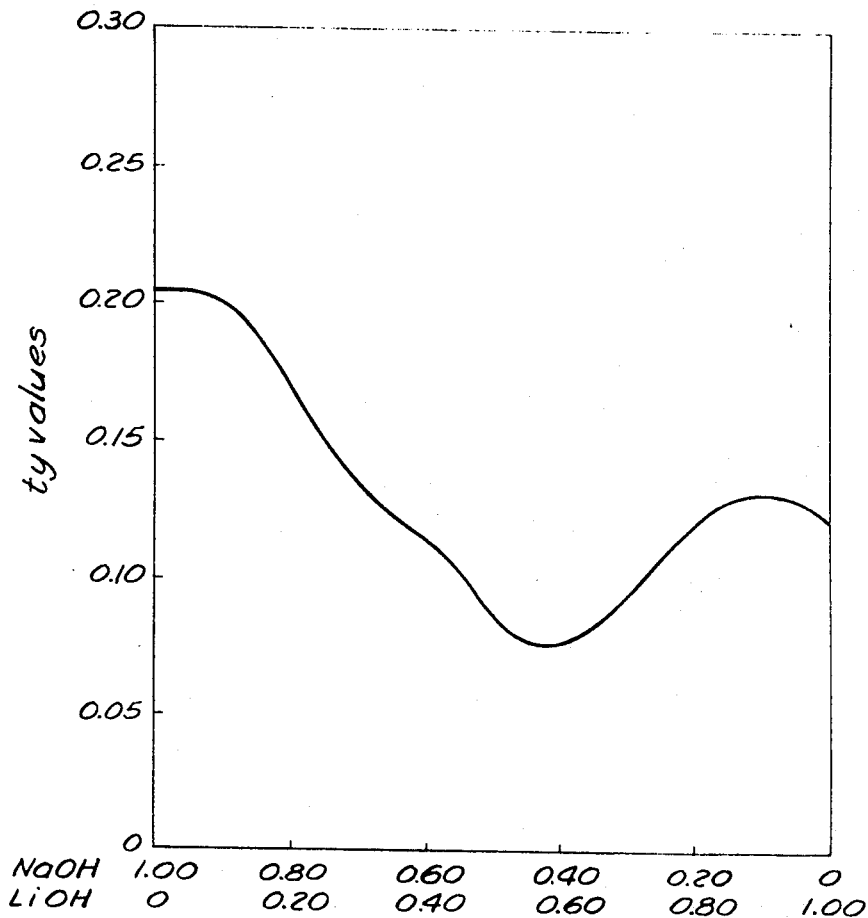

*ty VALUES OF NaOH, LiOH, AND RATIOS OF LiOH-NaOH SALTS OF CONDENSATION PRODUCT OF MONONAPHTHALENESULPHONIC ACID AND FORMALDEHYDE IN AQUEOUS CEMENT SLURRY (100 PARTS CEMENT AND 46 PARTS OF WATER BY WEIGHT). TOTAL SALT PRESENT IS 0.7 PART PER 100 PARTS. CEMENT TESTS AT 125°F.*

Fig. 1

INVENTORS.
Fred E. Hook
Clare H. Kucera
L. J. Scott
BY
ATTORNEY

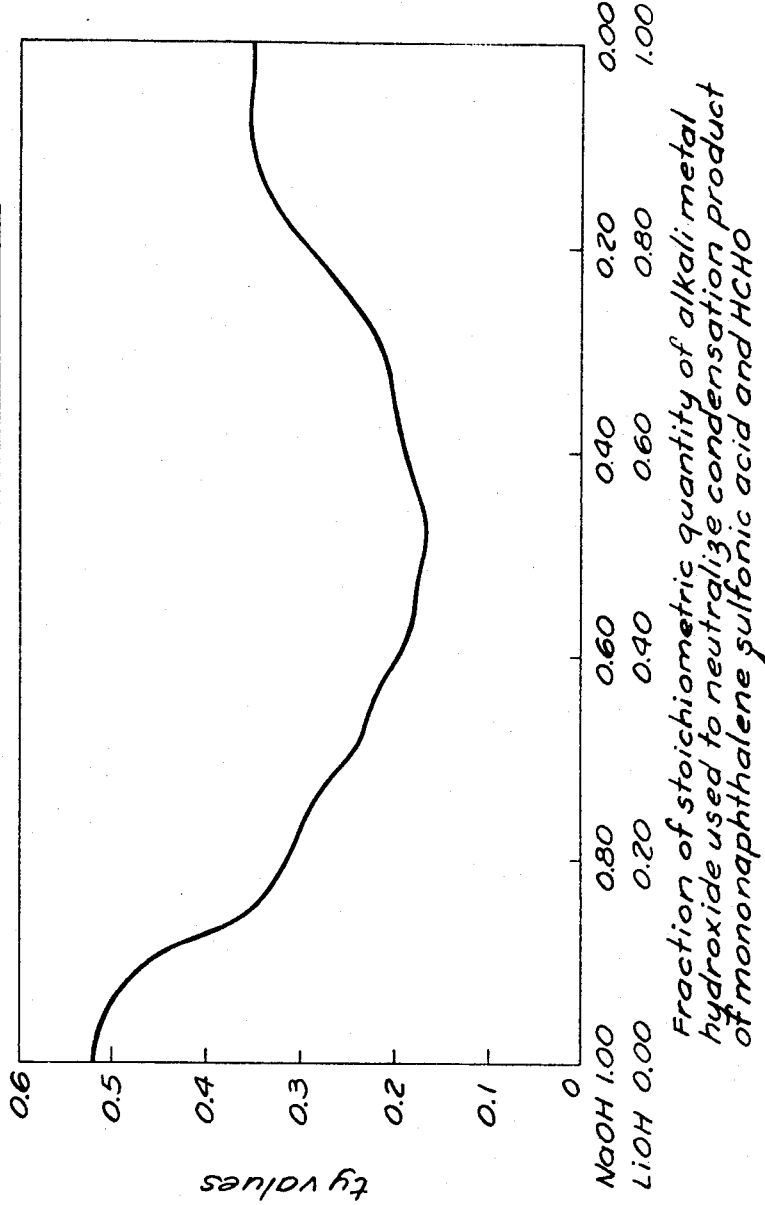

United States Patent Office 3,465,825
Patented Sept. 9, 1969

3,465,825
AQUEOUS CEMENTING COMPOSITION ADAPTABLE TO HIGH TURBULENT FLOW AND LOW FLUID LOSS TO POROUS CONTACTING SURFACES, AND METHOD OF CEMENTING A WELL USING SAME
Fred E. Hook and Clare H. Kucera, Tulsa, Okla., and L. J. Scott, Jr., Dallas, Tex., assignors to The Dow Chemical Company, Midland, Mich., a corporation of Delaware
Filed Dec. 2, 1966, Ser. No. 598,664
Int. Cl. E21b 33/138; C04b 7/02, 7/12
U.S. Cl. 166—293                                   14 Claims

ABSTRACT OF THE DISCLOSURE (1) An aqueous cement slurry containing a turbulence inducing agent which imparts to the slurry the capacity of attaining a state of turbulence, while in motion in a conduit, at a slower rate of movement and with less expenditure of energy than is necessary for such attainment, in the absence of said agent, which comprises, by weight, 100 parts of an hydraulic cement, between about 35 and about 65 parts of water, a turbulence inducer which is the lithium salt or the lithium-sodium mixed salt of the condensation product of mononaphthalene sulfonic acid and formaldehyde and optionally a fluid-loss control agent, of which water-soluble cellulose ethers are especially effective, and (2) The method of cementing, in a geologic formation penetrated by a wellbore, comprising injecting said slurry down the wellbore and emplacing the slurry at the desired locus in the formation.

---

The invention is an improved aqueous hydraulic cement slurry which is especially suited for use in cementing a well, particularly a well penetrating an oil- or gas-producing formation. The term, hydraulic cement, as used herein refers to portland, aluminous and pozzolana cements.

Minerals in fluid form, of which petroleum and natural gas are illustrative, are obtained almost exclusively from wells which penetrate an oil- or gas-bearing stratum in a subterranean formation. The efficient obtention of such minerals has presented a challenge to engineers and scientists. Problems associated therewith vary, dependent upon such conditions as the nature of the geologic formation, its location, the abundance and extent of the fluid mineral, and the relation of the fluid-bearing adjacent and superimposed strata. The problems are invariably complex. The following series of steps usually precede establishment of a well productive of oil or gas: (a) rights of exploration and drilling are ascertained; (b) a fluid-bearing stratum is then located through an exercise of these rights; (c) a borehole is drilled through the earth's crust and into the fluid-bearing stratum to tap the oil or gas therein; (d) casing is secured in position therein principally to insure, for practical purposes, permanence of the borehole for working the well; (e) a string of tubing is run into the hole inside of the casing and a pumping system provided (unless there is sufficient formation pressure) to bring the oil or gas to the surface; (f) the fluid flow from the well is thereafter maintained at a sufficiently high rate and for a sufficiently long period of time to make the venture economically feasible.

Since the advent of the first oil- and gas-producing wells, there have been marked advances in all phases of the above series of steps including: more dependable exploration techniques, better drilling and completion methods, and the use of improved compositions and processes of production which increase the rate of flow, assure longer production life, and prevent contamination of the fluid zone from intruding fluids, e.g., water and brine, and from dislodged earthen material.

Among the discoveries of improved compositions and processes of drilling wells and producing oil and gas therefrom have been those of improved cementing compositions and methods of cementing wells employing such compositions. Among the objectives attained by the use of an aqueous hydraulic cement composition in a well is that of cementing the casing in place and cementing off thief zones into which valuable minerals may be lost and cementing off intruding water and brine to inhibit their intrusion into the fluid-producing zone of the oil or gas well.

Aqueous hydraulic cement compositions comprising water and the cement (portland, aluminous or pozzolana), known generally as a neat cement, are usually employed in well cementing operations. Various additaments have been employed in cementing compositions, e.g., to control the rate of setting (particularly in wells penetrating formations at relatively high temperatures), to lessen the loss of the aqueous portion of the composition into the formation prior to its becoming set, and improved methods of locating and controlling the cementing operation at the desired level.

Among the desirable, if not essential, attributes of a satisfactory aqueous cement composition for cementing wells is that of adequate fluidity and sufficiently slow thickening rate to allow enough time to spot or locate the cementing composition at the desired level, to maintain the pipe through which the slurry is being injected substantially free of adhering accumulations of cement, assure adequate displacement of residual drilling mud, and to make good contact and form firm footings or bonds, when set, with the face of the formation, and, when desired, the casing, and to set to a strong durable unitary mass. It is also a desirable attribute of an aqueous cement slurry that the water content thereof be low if such can be attained without impairment of other properties, e.g., objectionable increased viscosity. It is a further desirable attribute of an aqueous cement slurry, particularly one used in underground operations, e.g., cementing wells, that there be low loss of fluid from the injected slurry to the formation while the slurry is setting to a solid.

In general, the cementing compositions employed heretofore have failed to insure the attainment of the above-mentioned objectives, particularly those of adequate displacement of residual mud and forming of firm bonds with the formation in all instances.

A need, accordingly, continues to exist for a cementing composition and method of cementing a well by which the above objectives will be reasonably assured of attainment.

The invention meets this need. It provides a cementing composition which has low viscosity, is easily mixed, develops a high compressive strength, has a low tendency for solids suspended therein to settle out and exhibits little tendency towards bridging, affords good resistance to contamination, has a low yield point and coefficient of rigidity (as hereinafter explained), and lends itself readily to modification to reduce markedly loss of fluid during the setting period to a porous wall in contact therewith. Such aqueous cement slurry can be pumped down a well and positioned as desired therein, employing relatively low pumping rates, with little or no foaming, whereby residual mud is more completely displaced and better bonds are formed with the formation, (and/or the casing) when it subsequently sets to a monolithic mass.

It is known that conventional aqueous cement slurries, according to common practice, tend to enter a well in laminar flow, where as it has been found that turbulent flow is definitely preferred. In accordance with the practice of the invention, however, an aqueous cement composition is provided which enters a well in turbulent flow. Such desired flow is obtained without objectionable loss in the desired properties of the slurry, e.g., capacity to carry additaments employed to inhibit circulation loss, decrease the density, reduce the cost, and lower the fluid loss. The cement slurry prepared according to the invention has no detectable adverse effects but, on the contrary, imparts a measurable inhibition to fluid loss from the aqueous cement slurry to a porous formation prior to set particularly in conjunction with other fluid loss agents, e.g., water-soluble cellulose ethers. The additives required by the invention do not interfere with the rate of set of the cement slurry, do not increase water separation from the slurry, and do not objectionably lessen the compressive strength of the resulting set cement. The use of such fluid loss additives as a water-soluble cellulose ether has been heretofore normally greatly limited because its presence tended to thicken the cement slurry to a point which lessened its pumpability and prevented it from being located as desired.

Turbulent flow (as opposed to laminar flow) is highly desirable when injecting an aqueous cement slurry into position in a well. A satisfactory well cementing job requires that a sufficient amount of the drilling mud, remaining between the casing and the borehole wall, be displaced. A cement slurry entering this space under laminar flow conditions often does not achieve the desired mud displacement. Moreover, the cement slurry is customarily injected either down the casing or a string of tubing in the casing and at the lower end thereof is diverted to the annulus between the casing and the formation wall. Residual mud must be displaced from the annulus in the lower part of the borehole. The complete reversal of direction of the cement slurry at the lower end of the casing often detracts from the performance of the cement slurry to displace the mud cleanly and satisfactorily. Turbulent flow in the cement slurry substantially lessens the effect of such turns. It is often desirable to position the cement slurry in irregular voids, e.g., where the wellbore wall is unusually jagged, or in squeeze cementing jobs where partial constrictions in the passageways may be encountered prior to entrance into a relatively large void. As a result, poor bonding with the formation may result. Forcing the cement slurry at turbulent flow into such irregular voids or past such partial constrictions improves the strength of the bonds formed between the cement and the formation wall of the void and insures a better seal when the cement slurry has set.

The procedure for preparing the cementing composition of the invention and method of cementing a well employing the composition are set out in the following description and are succinctly defined in the appended claims.

The invention, broadly, comprises admixing, with an aqueous slurry consisting of between about 35 and about 65 parts of water per 100 parts of the cement by dry weight, a turbulence inducer which is the lithium salt or the lithium-sodium mixed salt of the condensation product of mononaphthalene sulfonic acid and formaldehyde. It may contain an antifoaming agent, sometimes called antifoamer. It preferably employs a supplemental fluid-loss control agent, preferably a water-soluble cellulose ether. The use of such ether in any amount is very difficult in conventional cementing of wells because it objectionably thickens the slurry. However, in the presence of the condensate salt required by the invention, such cellulose ether may be used in effective amounts without adverse effects on the viscosity and compatability of the slurry.

The lithium salt or lithium-sodium mixed salt of the condensation product required by the practice of the invention is prepared by condensing formaldehyde and mononaphthalene sulfonic acid in a molar ratio to yield about 3 moles of water (which is conveniently removed as desired) and one equivalent of the desired intermediate said product considered to have the formula:

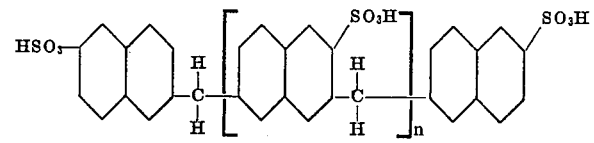

wherein $n$ has a value sufficient to give a molecular weight of between about 500 and 3000, usually between about 1000 and 2000. The product so made is subsequently neutralized by reacting it with LiOH, or a mixture of NaOH and LiOH wherein up to 85% of the salt of the condensate may be the sodium form.

In other words, the condensate salt may consist of all or substantially all the lithium form or it may be a mixture of the lithium form and the sodium form such mixture consisting of as much as 85 parts of the sodium salt per 100 parts of the salt mixture, i.e., lithium:sodium proportions of 85:15, by weight. Mixtures of the lithium and sodium salts of proportions between 75:25 and 25:75 of each are preferred. Minor amounts of other salts of the mononaphthalene sulfonic acid-formaldehyde condensate may be present without defeating the objectives of the invention.

The sodium salt-lithium salt mixture is conveniently prepared by first neutralizing the condensed acid product with only enough LiOH to convert between about one-fourth and three-fourths, e.g., about one-half, of the acid product to the lithium salt. Thereafter the balance of the condensed monosulfonic acid-HCHO product is reacted with NaOH to convert it to the sodium form.

A synergistic effect is accomplished by employing the mixed salts of lithium and sodium of the condensation product as demonstrated by FIGURES 1 and 2 of the annexed drawing.

The following characteristics are representative of the mixed lithium salt and sodium salt of the condensation product of mononaphthalene sulfonic acid and HCHO which is readily available on the market.

| | |
|---|---|
| Appearance | Fine, light tan powder. |
| Active matter content | 87%. |
| Inert matter content ($Na_2SO_4$) | 5 to 7%. |
| Ash | 31 to 32%. |
| Moisture | 5%. |
| Solubility | Freely in hard or soft water. |
| Solution, color | Clear-light amber. |
| Foam producing tendency | Nil. |
| Effect on surface tension | Nil. |
| pH of 10% aqueous solution | 9 to 9.5. |
| Viscosity of 30% aqueous solution at 25° C. | 6 centipoises. |
| Viscosity of 35% aqueous solution at 25° C. | 7 centipoises. |

The required salt of the condensation product may be employed in the practice of the invention in an amount of between about 0.01% and about 20.0%, based upon the dry weight of the cement employed. More than about 10.0% of the salt, referred to herein as a turbulence inducer, may be used without adverse effect but such higher amounts are not warranted. The preferred amount to employ is between about 0.1% and about 5.0%.

The antifoaming agent, when found advisable to employ, may be any of the known agents which, when admixed with an aqueous solution or slurry, lowers the surface tension and thereby lessens the tendency to foam. However, the preferred antifoaming agents to employ in the invention are tributyl phosphate and polyoxyalkylene glycols having a molecular weight between about 1000 and 6000, and more preferably polyoxypropylene glycol having a molecular weight between about 2000 and 4000. The antifoaming agent, when desired, is usually employed in an amount between about 0.001% and 0.10% based on the dry weight of the cement. An antifoaming agent is usually not necessary because the composition of the invention does not tend to foam excessively. If employed, an amount of between about 0.001 part and 0.10 part, based on the dry weight of the cement employed, is suggested.

Although we have discovered that the turbulence inducer employed herein also lessens loss of fluid from the cement slurry, it is recommended that an additional fluid-loss control agent be employed in the more porous formations.

One embodiment of the invention employs a cellulose ether in an amount of between about 0.01 to about 2.5 parts, preferably between about 0.1 and about 1.0 part, based on 100 parts by dry weight of the cement present.

A water-soluble cellulose ether of the following types may be used: an hydroxyalkyl cellulose, an hydroxyalkyl carboxyalkyl cellulose, an hydroxyalkyl hydroxyalkyl cellulose, or an hydroxyalkyl alkyl cellulose. The hydroxyalkyl groups may be hydroxyethyl, hydroxypropyl, or hydroxybutyl. The carboxyalkyl groups may be carboxymethyl or carboxyethyl. The alkyl groups may be methyl or ethyl. Substitution may occur at one or more of the hydroxyl sites of the cellulose molecule. The possible substituents at the hydroxyl sites of the cellulose molecule may be illustrated by the following:

| General type | Name of substituent attached to the cellulose oxygen atom | Formula |
|---|---|---|
| Hydroxyalkyl | Hydroxyethyl | $-(CH_2-CH_2-O)_x-H$ |
| Carboxyalkyl | Carboxymethyl | $-CH_2-C(=O)-ON_a$ |
| Alkyl | Methyl | $-CH_3$ |

Specific examples illustrative of the cellulose ethers suitable for use in the practice of the invention are: hydroxypropyl cellulose; hydroxyethyl cellulose; hydroxybutyl cellulose; hydroxyethyl carboxymethyl cellulose; hydroxyethyl carboxyethyl cellulose; hydroxypropyl carboxymethyl cellulose; hydroxypropyl carboxyethyl cellulose; hydroxybutyl carboxymethyl cellulose; hydroxybutyl carboxyethyl cellulose; hydroxyethyl hydroxypropyl cellulose; hydroxyethyl methyl cellulose; hydroxyethyl ethyl cellulose; hydroxypropyl methyl cellulose; and hydroxypropyl ethyl cellulose. Due to ready availability and peculiar adaptability to the practice of the invention, hydroxyethyl cellulose (HEC) is the preferred supplemental fluid-loss additive to employ.

Methods of preparing water-soluble cellulose ethers are known. In general, one method is as follows:

Cellulose, e.g., cotton linters or wood pulp, preferably in an organic carrier liquid, e.g., butanol or isopropyl alcohol, are mixed with an aqueous NaOH solution, e.g., 20% to 50% by weight, and an alkylene oxide is admixed therewith in a suitable reactor provided with stirrer and temperature control means. Air is excluded from the reactor.

The reactor is heated at autogenous pressure to form the desired ether which is thereafter removed from the reactor, washed and dried. Details of a satisfactory method of preparing water-soluble cellulose ethers is set out in U.S. Patent 3,049,537.

Another method of preparing water-soluble cellulose ethers for use in the practice of the invention is that described in U.S. Patent 2,831,852.

Other fluid loss control agents that may be used in the practice of the invention are those described in U.S. Patent 3,140,269 which employs a copolymer of maleic anhydride and an N-vinyl nitrogen-containing ring monomer together with a poly(arylvinylbenzyl) compound, e.g., poly(arylvinylbenzyl)alkyl- and hydroxyalkyl-substituted quaternary ammonium bases and salts or poly(arylvinylbenzyl)sulfonium alkyl- and hyroxyalkyl-substituted bases and salts.

Still other fluid loss control agents that may be used with the condensate salt of the invention in aqueous cement slurries include those described in U.S. Patent 3,094,501 which employs a homopolymer of which poly(arylvinylbenzyl)alkyl- and hydroxyalkyl-substituted quaternary ammonium bases and salts or poly(arylvinylbenzyl)sulfonium alkyl- and hydroxyalkyl-substituted bases and salts are illustrative.

Another fluid loss control agent which may be employed in the practice of the invention is that described in U.S. Patent 3,086,588 which describes the use of sulfonated polyvinyltoluene or the ammonium or alkali metal salt thereof, with or without an alkali metal sulfate in aqueous cement slurries.

Because of the beneficial effect on viscosity of the presence of the lithium salt or mixture of lithium and sodium salts of the condensates of mononaphthalene sulfonic acid and HCHO, required by the invention, such polymeric fluid loss additives may be employed in adequate amounts to effectuate especially desirably low loss of fluid to a permeable formation without unduly thickening the cement slurry or requiring excessively high pumping rates (and expenditure of energy) to maintain the slurry, during injection, in a turbulent state.

Any convenient order or admixing the ingredients required for the cement slurry may be followed, employing conventional mixing equipment. All dry materials may be first mixed together and then admixed with water or each dry material may be separately admixed with the water.

The necessary ingredients for the practice of the embodiment of the invention employing a selected cellulose ether may be conveniently premixed and added to the cement slurry as a single additive. The premixture when employed usually consists of between about 10% and 90% by weight of each of (1) a water-soluble cellulose ether, (2) the alkali metal salt of the condensation product of mononaphthalene sulfonic acid and formaldehyde, and optionally between 5% and 15% of an antifoaming agent to make 100% total additive. This composite additive is usually employed in an amount of between about 0.5 and 2 parts, preferably between 0.75 and 1.75 parts, per hundred parts of dry cement. A specific example of such a premixed composite for use in the practice of the invention is one consisting of 54% hydroxyethyl cellulose, 46% of a substantially equal weight mixture of the lithium salt and the sodium salt of the mononaphthalene sulfonic acid-HCHO condensation product and, if considered necessary, up to 10% by weight of the additive composition of an antifoaming agent.

The preferred mode of preparing the composition of the invention is to admix the antifoaming agent, if deemed necessary, e.g., tributyl phosphate, with a pulverulent, particulate, or pelletized solid sorbent material, e.g., fuller's earth, natural or synthetic calcium silicates, pumice, particulated ceramic fragments, clay or the like, to form a free-flowing material; admixing the sorbent material containing the antifoaming agent with the turbulence inducer, i.e., the lithium or lithium-sodium salt of the condensation product of the mononaphthalene sulfonic acid and formaldehyde; admixing the cellulose ether selected with the cement to be subsequently added or with the mixture of solvent material and condensate product and thereafter admixing the resulting free-flowing particulate mixture (usually referred to as dry mixing) with an hydraulic cement; thereafter admixing the free-flowing blend of cement, sorbent material containing the antifoaming agent, and the turbulence inducer with a sufficient amount of water to make a pumpable slurry which is settable to a monolithic or unitary solid mass upon standing. The amount of sorbent material employed is usually between about 1 and about 10 parts per 100 parts of dry cement.

The slurry so made has a reduced coefficient of rigidity and low yield point value and requires a lower injection rate to attain turbulent flow. If preferred, the cellulose ether, when employed may be admixed with the water prior to admixture with the other ingredients.

To carry out the method of the invention, the above-prepared aqueous composition of low rigidity and yield point value is injected down the wellbore at a sufficient rate to attain turbulent flow and to position it at a pre-determined level, usually exterior of the casing where the thus positioned composition makes good contact with the face of the formation, and (when desired) also with the exterior of the casing, where it sets to a unitary mass, firmly bonded to the contacting surfaces.

Any hydraulic cements falling within the American Petroleum Institute (API) Classes designated A, B, C, D, E, F, and N may be employed, in the practice of the invention, as set out in Recommended Practice for Testing Oil-Well Cements and Cement Additives, 12th edition (March 1964), usually identified as API RP10A, procurable from the American Petroleum Institute, New York, N.Y.

Class A is often referred to as regular or normal setting cement and Classes D and E as slow-setting cements. Cements used in well cementing are largely one of the above-designated cements. Descriptions of these and the other API Classes of cements may be found in API RP10A. Further descriptions of these cements may be obtained by referring to patents, e.g., U.S. Patents 2,580,565, 2,771,953, and 2,782,858.

Analysis of typical Classes A, D, and E cements are set out below:

Class A

| Ingredient: | Weight percent |
|---|---|
| Tricalcium silicate | 53.4 |
| Dicalcium silicate | 21.5 |
| Tricalcium aluminate | 10.2 |
| Tetracalcium aluminoferrite | 8.2 |
| Calcium sulfate | 3.9 |
| Undetermined | Balance |

Class D

| Tricalcium silicate | 30.7 |
|---|---|
| Dicalcium silicate | 45.2 |
| Tetracalcium aluminoferrite | 20.1 |
| Calcium sulfate | 2.2 |
| Undetermined | Balance |

Class E

| Tricalcium silicate | 52.0 |
|---|---|
| Dicalcium silicate | 28.0 |
| Tricalcium aluminate | 5.6 |
| Tetracalcium aluminoferrite | 13.7 |
| Starch (in quantitative amounts) | (Not measurable) |
| Undetermined | Balance |

Turbulent flow is readily calculated for an aqueous cement slurry by the following procedure: The following values are obtained or measured: The diameters of the borehole; the outside diameter of the pipe through which the slurry will be injected into the well; the density of the slurry in pounds per gallon; the coefficient of rigidity ($n$) in pounds per second-foot; and the yield point value in pounds per square foot ($ty$). The $n$ and $ty$ values are calculated from the Fann values as herein described. The critical pump rate at which laminar flow becomes turbulent flow is then calculated according to the equation:

$$PR_c = \frac{140(D_h + D_p)}{a} n + \sqrt{n^2 + \frac{(D_h - D_p)^2 ty a}{2690}}$$

where:

$PR_c$ is the critical pump rate in barrels per minute.
$D_h$ is the diameter of the borehole in inches.
$D_p$ is the outside diameter of the pipe in inches.
$a$ is the density of the slurry in pounds per gallon.
$n$ is the coefficient of rigidity in pounds per second-foot.
$ty$ is the yield value in pounds per square-foot.

Turbulent flow may be ascertained by calculating the coefficient of rigidity (designated $n$) and yield point value (designated $ty$) from the Fann Viscometer values by the prescribed procedure of the Fann Instrument Corporation, 3202 Argonne, Houston, Tex. The coefficient of rigidity is expressed in pounds per second-foot and yield point value is expressed in pounds per square foot. The viscometer employed is the Model 35 Fann Rotational Viscometer. To determine these values by the use of the viscometer, the cement is dry mixed in accordance with the procedure in API RP10B. The dry cement is then made into a slurry, employing the proportions of cement and water specified in Section 2, Table 2.2 of API RP10B, e.g., 46 parts of water per 100 parts of dry Class A cement by weight, and is immediately transferred to the Fann sample cup. The instrument reading of the Fann Viscometer is then ascertained at a speed of 600 revolutions per minute (r.p.m.). After the reading has become stabilized at 600 r.p.m. speed, the instrument is adjusted to 300 r.p.m. and the reading again recorded after the value becomes stabilized at that speed. The rigidity ($n$) and yield value ($ty$) are calculated as follows:

$$n = N(600 \text{ reading} - 300 \text{ reading})(0.000672)$$

$$ty = N \frac{[300 \text{ reading} - (600 \text{ reading} - 300 \text{ reading})]}{100}$$

$N$ = (in the above equations) the extension factor of the torque spring of the instrument. This is a value for each instrument and is a part of the direction for use of the invention obtainable from the Fann Company.

Turbulence is encouraged when either the $n$ or the $ty$ value is low, and accordingly, particularly when both are low. In a general way, a low $n$ value indicates an early tendency to turbulence as pumping begins; a low $ty$ value indicates a sustained tendency to turbulence after continued motion of the cement slurry. Usually, a change in one value is accompanied by some change in the same direction in the other value, so that calculating but one value is indicative of the turbulence of a given liquid.

The following tests were conducted to illustrate the practice of the invention.

Series one (Tests 1 to 8)

This series of tests was run to show the low coefficient of rigidity and yield value of the composition on the invention. The series consisted of eight tests employing by weight 46 parts of water, 0.7 part of the lithium salt, sodium salt, or mixture of such salts of the condensate of mononapthalene sulfonic acid and formaldehyde, and 100 parts of Class A cement. Table I below shows the percent of the stoichiometric quantity of either LiOH or NaOH or both employed to neutralize the condensate to yield the respective salt. The calculated $ty$ value is also shown.

TABLE I

| Test identification | NaOH, percent | LiOH, percent | Ty value obtained |
|---|---|---|---|
| 1 | None | 100 | 0.1250 |
| 2 | 25 | 75 | 0.1040 |
| 3 | 35 | 65 | 0.0871 |
| 4 | 45 | 55 | 0.0775 |
| 5 | 55 | 45 | 0.1040 |
| 6 | 65 | 35 | 0.1225 |
| 7 | 75 | 25 | 0.1489 |
| 8 | 100 | None | 0.2029 |

The results of the above table are shown as FIGURE 1 of the annexed drawing. Reference to the table or the drawing shows that a synergistic effect (as opposed to a cumulative effect) is obtained by using a mixture of both the lithium salt and the sodium salt. It also shows that the use of 100% of lithium salt gives unexpectedly superior results over the use of all sodium salt of the specified condensate. It indicates that not more than about 85%, and preferably not over 75%, of sodium salt of the total weight of salt present should be used.

The above tests were repeated, employing a 2% by weight CaCl$_2$ brine instead of water to prepare the aqueous slurry. Substantially the same shape curve was obtained showing that synergism exists when both the lithium and the sodium salts of the condensate are present and that the use of all lithium salt gives markedly superior performance over the use of all sodium salt. The curve is shown on FIGURE 2 of the drawing.

salt alone, and preferably in admixture with the sodium salt results in satisfactory performance.

Series four (Examples 20–23)

This series was run substantially as was Series three except that Class E cement (the aqueous slurries which ordinarily show unusually high fluid loss in porous formations) was used instead of Class A cement. The amounts of additives and the ty and fluid loss values are shown in Table IV.

TABLE IV

| Test identification | 0.552 part of salt of condensate | | Parts HEC | ty Value | Fluid loss at 1,000 p.s.i.g. at 200° F. ml./30 min. |
|---|---|---|---|---|---|
| | Percent Na salt | Percent Li salt | | | |
| 20 | 100 | None | 0.648 | 0.65 | 49 |
| 21 | None | 100 | 0.648 | 0.52 | 50 |
| 22 | None | None | 0.648 | 0.65 | 274 |
| 23 | 50 | 50 | 0.648 | .49 | 39 |

Series two (Tests 9 to 15)

The tests of this series were performed for the purpose of showing the improvement in both fluid loss control and turbulence values by the practice of the invention employing various classes of cement, hydroxyethyl cellulose (HEC), and a mixture of the lithium and the sodium salts of the condensate of mononaphthalene sulfonic acid-HCHO, the mixture consisting of 54% HEC and 46% of the mixed salt. The HEC and salt mixture were each added as aqueous solutions.

Reference to Table IV shows that when there is no salt of the condensate present, or only the sodium salt thereof present, with HEC in a cement slurry, the ty value and the fluid loss value are high. The use of the lithium salt alone or in admixture with sodium salt alone or in admixture with sodium salt is satisfactory.

Series five (Tests 24 to 33)

This series of tests was performed to show the effects of the presence of varying amounts of hydroxyethyl cellulose and the lithium salt of mononaphthalene sulfonic

TABLE II

| Test identification | Name and class of cement (100 parts by weight) | Mixed condensate salt (parts by weight) | HEC (parts by weight) | Temp. in ° F. | ty Value | Fluid loss at 1,000 p.s.i.g. in ml./30 min. |
|---|---|---|---|---|---|---|
| 9 | Incor, C | 0.460 | 0.540 | 125 | 0.510 | 219 |
| 10 | Fort Collins Ideal, A | 0.368 | 0.432 | 144 | 0.290 | 89 |
| 11 | Universal Atlas, A | 0.368 | 0.432 | 144 | 0.110 | 55 |
| 12 | Alamo, A | 0.414 | 0.486 | 144 | 0.005 | 64 |
| 13 | Louisiana, A | 0.414 | 0.486 | 144 | 0.005 | 131 |
| 14 | L. C. Texcor, E | 0.552 | 0.648 | 200 | 0.370 | 34 |
| 15 | Unaflo, D | 0.552 | 0.648 | 200 | 0.200 | 35 |

Table II shows that the turbulence inducer and the supplemental fluid loss control agent may be used with the common cements, including Classes C and E which present specific problems of high fluid loss in the absence of a control additive for the lessening thereof.

Series three tests (Tests 16 to 19)

This series of tests was performed to show the improved turbulence and fluid loss values employing the sodium salt, the lithium salt, equal weight mixtures of the two salts, or no salt of the mononaphthalene sulfonic acid-HCHO condensate. 100 parts of Class A cement and 46 parts of water were employed at 144° F. The same total amount of the salt, except in test 18, was used in each test. The ty and fluid loss values obtained are shown in Table III.

acid-formaldehyde condensation product. 46 parts of water by weight per 100 parts of Class A cement were employed. The ty value and fluid loss at 1000 p.s.i.g. in ml. in 30 minutes were ascertained. The tests were run at 144° F. The amounts of each component present in each test and the results are shown in Table V.

TABLE V

| Test identification | Parts HEC | Parts percent Li salt of condensate | ty Value | Fluid loss at 1,000 p.s.i.g in ml./30 min. |
|---|---|---|---|---|
| 24 | 0.350 | 0.280 | 0.085 | 154 |
| 25 | 0.500 | 0.200 | 0.137 | 91 |
| 26 | 0.430 | 0.363 | 0.082 | 74 |
| 27 | 0.443 | 0.373 | 0.111 | 88 |
| 28 | 0.450 | 0.380 | 0.089 | 69 |
| 29 | 0.454 | 0.433 | 0.130 | 72 |
| 30 | 0.471 | 0.474 | 0.085 | 64 |
| 31 | 0.484 | 0.482 | 0.104 | 58 |
| 32 | 0.550 | 0.280 | 0.096 | 135 |
| 33 | 0.550 | 0.480 | 0.112 | 48 |

TABLE III

| Test identification | Parts of salt of condensate | | Parts HEC | ty Values | Fluid loss at 1,000 p.s.i.g. at 144° F. in ml./30 min. |
|---|---|---|---|---|---|
| | Percent Na salt | Percent Li salt | | | |
| 16 | 0.57 | None | 0.43 | 0.220 | 160 |
| 17 | None | 0.57 | 0.43 | 0.095 | 82 |
| 18 | None | None | 0.43 | 1.28 | 186 |
| 19 | 0.285 | 0.285 | 0.43 | 0.09 | 70 |

Reference to Table III shows that when the salt of the condensate consists of all sodium salt or when no salt is present, both the ty value (and accordingly, tendency to a turbulent state) and the fluid loss control are unsatisfactory. On the other hand, the presence of the lithium Reference to Table V shows that excellent results are obtained employing hydroxyethyl cellulose and the lithium salt of the condensation product of mononaphthalene sulfonic acid and HCHO, both on decreasing the ty value to induce turbulence and on decreasing the loss of fluid from the aqueous cement slurry during the setting period of the slurry.

Having described our invention, what we claim and desire to protect by Letters Patent is:

1. The aqueous hydraulic cement slurry settable to a hard unitary solid mass comprising by weight between about 30 and about 65 parts by weight of water, between about 0.01 and about 20.0 parts by weight of a turbulence-inducing additive which provides a state of turbulence in said slurry when being moved in a conduit at a slower rate of movement than is attainable in the absence thereof, said additive being selected from the class consisting of lithium salt and mixtures of the lithium salt and the sodium salt, wherein the lithium salt comprises at least 15% by weight of such mixture, of the condensation product of mononaphthalene sulfonic acid and formaldehyde having a molecular weight between 500 and 3000, and 100 parts by weight of an hydraulic cement selected from the class consisting of portland, aluminous, pozzolanic cements, and mixtures thereof.

2. The aqueous hydraulic cement slurry of claim 1, which contains between about 0.0001 and about 0.50 part of an antifoaming agent per hundred parts by weight of hydraulic cement present.

3. The composition of claim 1, wherein said turbulence-inducing additive is present in the amount of between about 0.1 and 5.0 parts per hundred dry weight of cement present.

4. The composition of claim 1, wherein said turbulence-inducing additive is a mixture consisting of at least 15% of the lithium salt and up to 85% of the sodium salt of said condensation product.

5. The composition of claim 1, wherein said turbulence-inducing additive is substantially all the lithium salt of said condensation product.

6. The composition of claim 1, wherein a supplemental fluid loss control agent is admixed therewith, being selected from the class consisting of water-soluble cellulose ethers, polyvinyltoluene sulfonate, copolymers of maleic anhydrate and a N-vinyl ring monomer, poly(arylvinylbenzyl)alkyl-substituted quaternary ammonium bases and salts, and poly(arylvinylbenzyl)sulfonium alkyl-substituted bases and salts.

7. The composition of claim 6, wherein the water soluble cellulose ether is an hydroxyalkyl cellulose wherein the hydroxyalkyl group is selected from the class consisting of hydroxymethyl, hydroxyethyl, and hydroxypropyl.

8. The method of cementing wherein an aqueous hydraulic cement slurry is brought into contact with the face of an underground formation which comprises admixing between about 0.5 and about 20 parts by weight of an additive which induces turbulence in said slurry when being moved through a conduit at a slower rate of movement than is necessary to obtain turbulence in the absence thereof, said additive being selected from the class consisting of the lithium salt and mixtures of at least 15% of the lithium salt and up to 85% of the sodium salt of the condensation product of mononaphthalene sulfonic acid and formaldehyde having a molecular weight between about 500 and 3000, and an aqueous hydraulic cement slurry containing 100 parts by weight of an hydraulic cement selected from the class consisting of portland, aluminous, and pozzolanic cements, forcing said slurry so made through a conduit and emplacing it in the underground formation in contact with a face thereof where it sets accompanied by a reduced loss of fluid to said formation, to a monolithic solid having improved bonds with the formation.

9. The method according to claim 8, wherein an antifoaming agent, in an amount of between about 0.0001 and about 0.50 part per 100 parts dry weight of hydraulic cement is present in said slurry.

10. The method according to claim 8, wherein said turbulence-inducing additive is present in an amount of between about 0.1 and about 5.0 parts per 100 parts dry weight of cement.

11. The method according to claim 8, wherein said turbulence-inducing fluidity-imparting additive is a mixture consisting essentially by weight of the mixture of at least 15% of the lithium salt and up to 85% of the sodium salt of said condensate product.

12. The method according to claim 8, wherein said turbulence-inducing additive is substantially all the lithium salt of said condensation product.

13. The method according to claim 8, wherein a supplemental fluid-loss control agent is admixed with the slurry, said supplemental agent being selected from the class consisting of water-soluble cellulose ethers, polyvinyltoluene sulfonate, copolymers of maleic acid and a N-vinyl ring monomer, poly(arylvinylbenzyl)alkyl-substituted quaternary ammonium bases and salts and poly-(arylvinylbenzyl) sulfonium alkyl-substituted bases and salts.

14. The method according to claim 13, wherein said water-soluble cellulose ether is an hydroxyalkyl cellulose, the hydroxyethyl group being selected from the class consisting of hydroxymethyl, hydroxyethyl, and hydroxypropyl.

References Cited
UNITED STATES PATENTS

| | | | |
|---|---|---|---|
| 2,580,565 | 1/1952 | Ludwig | 106—93 |
| 2,690,975 | 10/1954 | Scripture | 106—90 |
| 2,709,661 | 5/1955 | Dietz | 106—100 |
| 3,277,162 | 10/1966 | Johnson | 260—505 |
| 3,359,225 | 12/1967 | Weisend | 260—29.6 |

TOBIAS E. LEVOW, Primary Examiner

WATSON T. LEVOW, Assistant Examiner